United States Patent Office 3,102,907
Patented Sept. 3, 1963

3,102,907
SEPARATION OF NAPHTHOIC ACIDS
Carl Serres, Jr., Hammond, Ind., and Ellis K. Fields, Chicago, Ill., assignors to Standard Oil Company, Chicago, Ill., a corporation of Indiana
No Drawing. Filed Oct. 4, 1960, Ser. No. 60,295
7 Claims. (Cl. 260—525)

This invention relates to the separation of naphthoic acids and more particularly pertains to the separation of 1- and 2-naphthoic acids.

It has been recently found that naphthoic acids can be readily prepared by the liquid phase oxidation of alkyl substituted naphthalenes with air or other source of molecular oxygen in the presence of a novel and unique catalyst system comprising a source of bromine and a heavy metal oxidation catalyst. By this process exceptionally high yields of naphthoic acids can be obtained. Although individual isomers of alkyl naphthalenes such as 1-methyl or 2-methyl naphthalenes can be individually oxidized to the respective 1- and 2-naphthoic acids, mixtures of 1-alkyl and 2-alkyl naphthalenes are frequently obtained, especially from processes for treating various petroleum fractions. Such mixtures of 1- and 2-alkyl naphthalenes can also be readily oxidized employing the above-mentioned novel and unique catalyst system to a mixture of 1- and 2-naphthoic acids. As will be appreciated, each of these isomeric naphthoic acids finds different uses so that when prepared as a mixture containing both 1- and 2-naphthoic acids, it is highly desirable to separate the mixture into the individual isomeric products.

It has been suggested that the separation of 1- and 2-naphthoic acids from mixtures thereof can be accomplished through the formation of copper salts of these acids. However, the copper salts are not readily prepared and form a series of complex basic and acidic copper carbonate-naphthoate salts. Some alkali metal salts, in particular, potassium salts of naphthoic acids form a complex series of acid-acid salt chelation complexes. Hence, the use of alkali metal salts to attempt the separation of 1- and 2-naphthoic acids from mixtures thereof would present considerable complications. We have found that although there is a fivefold difference between solubilities of 1-sodium naphthoate and 2-sodium naphthoate in water, the 2-sodium naphthoate is soluble in water to the extent of about 10 weight percent. Hence, the use of sodium salts would be unsuitable for quantitative separations of 1- and 2-naphthoic acids from mixtures thereof.

We have discovered a process for the separation of 1- and 2-naphthoic acids from mixtures thereof which accomplishes the separation in a substantially quantitative manner. The process of this invention utilizes the great difference in solubilities of the ammonium salts of 1- and 2-naphthoic acids in certain lower alkanols. The ammonium salts of the mixture of isomeric 1- and 2-naphthoic acids are formed in the presence of lower aliphatic mono-alcohols containing from 3 to 8 carbon atoms. The formation of the ammonium salts can be suitably carried out at 0 to 80° C. and preferably at 15 to 40° C. These alcohols include, for example, n-propanol, isopropanol, n-butanol, isobutanol, tertiary-butyl alcohol, the pentanols, the hexanols, the heptanols, and the octanols. Of these lower alkanols, the propanols and butanols can be advantageously employed, especially n-propanol and n-butanol. The preferred lower alkanol for the process of this invention is n-propanol. Suitable amounts of alkanol employed related to the naphthoic acid mixture can be in the range of 2.5 up to 15, preferably 4 to 6, parts alkanol per part of naphthoic acid mixture by weight.

In general, the process of this invention comprises dissolving or suspending a mixture of 1- and 2-naphthoic acids in the $C_3$ to $C_8$ alcohol and forming the ammonium salts at 0 to 80° C. and preferably 15 to 40° C. The insoluble 2-ammonium naphthoate which precipitates from the solution of 1-ammonium naphthoate is then removed by any means for separating a solid phase from a liquid phase. After recovery of the precipitated 2-ammonium naphthoate from the alcohol solution of the other isomer as by filtration, decantation, centrifugation, and any other convenient means for separating a solid from a liquid phase, free 2-naphthoic acid can be recovered from its ammonium salt by the thermal decomposition thereof or by treating a solution of the 2-ammonium naphthoate with a mineral acid or a material which will form an acid such as carbon dioxide, sulfur dioxide and sulfur trioxide. It is preferred to treat the solution of 2-ammonium naphthoate with sulfur dioxide, for this process for preparing free-naphthoic acid may be cyclic and regenerative. For example, 2-ammonium naphthoate can be dissolved or suspended in water and treated with sulfur dioxide. The precipitated free 2-naphthoic acid is recovered by any desirable means such as filtration and the ammonium sulfite solution is combined with a mixture of 1- and 2-naphthoic acids to prepare a mixture of ammonium naphthoates. Sulfur dioxide is evolved and may be used again to prepare an additional amount of free 2-naphthoic acid. The same preferred process for recovering free 2-naphthoic acid can be employed to recover free 1-naphthoic acid from its ammonium salt.

It is appreciated that in a publication entitled "The Neutral Ammonium Salts of Organic Acids and Their Substituted Derivatives," appearing in the Journal of the American Chemical Society, volume 40, beginning at page 683, the authors McMaster and Wright describe at page 688 the preparation of the ammonium salts of each of alpha-naphthoic acid and beta-naphthoic acid and also report their qualitative observations on the solubilities of each of these ammonium salts in various solvents. For example, the authors state that ammonium alpha-naphthoate is very soluble in ethyl alcohol and methyl alcohol. The authors also state that ammonium beta-naphthoate is only slightly soluble in ethyl alcohol. However, we have found that the solubilities of ammonium naphthoates and especially 2-ammonium naphthoate, vary with the alcohol employed. For example, 2-ammonium naphthoate is more soluble in methanol than in ethanol. We have also found that the solubility of 2-ammonium naphthoate decreases as the carbon chain of the alkanol increases in size. This is also true for the 1-ammonium naphthoate. However, it is indeed striking that by the process of this invention, as hereinafter illustrated, the isomeric naphthoic acids can be separated as sharply and as cleanly without resorting to any recrystallization techniques.

The following are examples illustrating the process of this invention.

*Example 1*

A mixture containing equal parts by weight of 1- and 2-naphthoic acids, such as obtained from the oxidation of a mixture containing about equal parts by weight of 1- and 2-methyl naphthalenes, is separated in the following manner: a mixture containing 4.0 g. each of 1- and 2-naphthoic acids is suspended in 45 ml. of n-propanol, and anhydrous ammonia gas is bubbled through the mixture at room temperature until the acids are completely reacted. The mixture which becomes quite warm is then cooled to 25° C. and the insoluble salt removed by filtration. The insoluble salt is the ammonium salt of 2-naphthoic acid, M.P. 195–205° C. (decomp.) The melting point of the purest 2-ammonium naphthoate that could be prepared was found to be 203–208° C.

(decomp.) This 2-salt weighs 4.2 g. (96% of theory). The salt is suspended in 35 ml. of water and acidified with concentrated hydrochloric acid to spring the free 2-naphthoic acid. This acid after water-washing and drying has M.P. 181–185° C. (starting acid, M.P. 185–187° C.) The infrared spectrum is identical to that of pure authentic 2-naphthoic acid. It weighs 3.9 g.; thus separation and recovery of the essentially pure 2-naphthoic acid is 97.5%. The n-propanol filtrate contains the ammonium salt of 1-naphthoic acid. Evaporation of the n-propanol leaves the salt as a syrup which is dissolved in 35 ml. of water and treated with hydrochloric acid to spring the free 1-naphthoic acid. This acid is filtered, water washed and dried and has M.P. 150–155 (starting 1-naphthoic acid has M.P. 160–162° C.) It weighs 4.0 g. Thus a nearly quantitative separation is achieved. Separate solubility studies indicate the solubility of 1-ammonium naphthoate in n-propanol is greater than 40 weight percent while the solubility of 2-ammonium naphthoate is only 0.4 weight percent at 25° C.

*Example 2*

A mixture of 1- and 2-naphthoic acid is converted to the ammonium salts and these are separated as described in Example 1. The ammonium 2-naphthoate is suspended in 100 ml. water and shaken at 25° C. under 50 p.s.i.g. $SO_2$ pressure until no more $SO_2$ is absorbed. The white solid is filtered off, washed with a little water and dried. It weighs 3.9 g. and is substantially pure 2-naphthoic acid, melting at 184–186° C. The recovery is 97.5%.

The filtrate from the 2-naphthoic acid, containing ammonium bisulfite and ammonium sulfite, is heated with 4 g. 2-naphthoic acid at 60–100° C. until no more $SO_2$ is evolved. The evolved $SO_2$ is condensed and reused for springing more 2-naphthoic acid. The solid is filtered off and air-dried; it weighs 4.3 g. and is substantially pure ammonium 2-naphthoate, melting at 202–208° C. The yield is 98%.

This same treatment of ammonium 1-naphthoate with $SO_2$ gave 1-naphthoic acid in 98% yield. Reaction of 1-naphthoic acid with the ammonium bisulfite and sulfite-containing filtrate at 60–100° C. gave $SO_2$ and ammonium 1-naphthoate in 99% yield.

Although it is preferred to employ ammonia or ammonia sulfite and ammonium carbonate as a reactant for forming a mixture of ammonium naphthoates, said mixture of ammonium naphthoates can also be formed by the reaction of the mixture of naphthoic acids with an inorganic ammonium salt by the process involving metathesis. The inorganic ammonium salt should be, of course, the salt of an inorganic acid weaker than the naphthoic acids such as acetate, bicarbonate, carbonate, sulfide, or sulfite. Ammonium hydroxide might be used as a source of ammonia. However, its use would introduce water into the mixture which would unduly complicate the separation of the precipitated ammonium salt of 2-naphthoic acid from the alcohol solution.

What is claimed is:

1. A process for separating a mixture comprising 1- and 2-naphthoic acids substantially quantitatively into high purity individual isomeric products comprising forming the ammonium salts of a mixture of 1- and 2-naphthoic acids in the presence of an alkanol having from 3 to 8 carbon atoms in the molecule in the weight ratio of 2.5 to 15 parts of said alkanol per part of said naphthoic acid mixture at a temperature in the range of 0 to 80° C. whereby a 2-ammonium naphthoate precipitates substantially quantitatively, separating the precipitate from the alcoholic 1-ammonium naphthoate solution, recovering 2-naphthoic acid from said 2-ammonium naphthoate precipitate and recovering 1-naphthoic acid from said alcoholic solution of 1-ammonium naphthoate.

2. The process of claim 1 wherein the mixture of ammonium naphthoates is prepared by passing ammonia into an alcoholic composition containing a mixture of 1- and 2-naphthoic acids.

3. The process of claim 1 wherein the mixture of ammonium naphthoates is prepared by adding to the alcoholic composition containing 1- and 2-naphthoic acids an inorganic ammonium salt whereby the ammonium naphthoates are formed by metathesis.

4. The process of claim 1 wherein the lower alkanol is n-propanol.

5. The process of claim 1 wherein free 2-naphthoic acid is regenerated from its ammonium salt by thermal decomposition.

6. The process of claim 1 wherein 2-naphthoic acid is regenerated from its ammonium salt by reaction with an inorganic acid.

7. The process of claim 6 wherein the inorganic acid is sulfurous acid.

References Cited in the file of this patent

McMaster et al.: J. American Chemical Society, vol. 40, pp. 683–9. (Copy in Div. 6.)